(12) United States Patent
Sokawa et al.

(10) Patent No.: US 11,422,083 B2
(45) Date of Patent: Aug. 23, 2022

(54) METHOD AND APPARATUS FOR IDENTIFYING VALID OR INVALID FLOW PATH

(71) Applicant: NGK INSULATORS, LTD., Nagoya (JP)

(72) Inventors: Shingo Sokawa, Nagoya (JP); Yuki Oka, Konan (JP)

(73) Assignee: NGK Insulators, Ltd., Nagoya (JP)

( * ) Notice: Subject to any disclaimer, the term of this patent is extended or adjusted under 35 U.S.C. 154(b) by 136 days.

(21) Appl. No.: 17/038,277

(22) Filed: Sep. 30, 2020

(65) Prior Publication Data

US 2021/0010923 A1 Jan. 14, 2021

Related U.S. Application Data

(63) Continuation of application No. PCT/JP2018/016488, filed on Apr. 23, 2018.

(51) Int. Cl.
*G01N 15/08* (2006.01)
*G01N 23/083* (2018.01)
*C04B 38/00* (2006.01)
*G01N 23/046* (2018.01)
(Continued)

(52) U.S. Cl.
CPC ..... *G01N 15/0826* (2013.01); *C04B 38/0006* (2013.01); *G01N 23/046* (2013.01); *G01N 23/083* (2013.01); *B01D 46/2418* (2013.01); *B01D 2273/18* (2013.01);
(Continued)

(58) Field of Classification Search
CPC .... G01N 15/00; G01N 15/08; G01N 15/0826; G01N 23/00; G01N 23/04; G01N 23/046; G01N 23/083; G01N 2223/04; G01N 2223/419; G01N 2015/084; B01D 46/24;
(Continued)

(56) References Cited

U.S. PATENT DOCUMENTS 6,516,080 B1 2/2003 Nur
8,897,549 B2 11/2014 Sakashita et al.
2013/0058839 A1 3/2013 Miyairi
(Continued)

FOREIGN PATENT DOCUMENTS

JP 2010-138770 A1 6/2010
JP 2013-053589 A1 3/2013
(Continued)

OTHER PUBLICATIONS

English translation of the International Preliminary Report on Patentability (Chapter I) (Application No. PCT/JP2018/016488) dated Nov. 5, 2020.
International Publication No. WO 2013/146498 A1 (Ref. AF) corresponds to U.S. Pat. No. 8,897,549 B2 (Ref. AB).
Japanese Patent Publication No. 2016-199450 A1 (Ref. AG) corresponds to U.S. Patent Application Publication No. 2016/0307318 A1 (Ref. AC).
(Continued)

*Primary Examiner* — Nguyen Q. Ha
(74) *Attorney, Agent, or Firm* — Burr & Brown, PLLC

(57) ABSTRACT

Method of identifying a valid flow path includes: performing fluid analysis of a porous body, which is ought to have inflow surface and outflow surface, based on structure data representing a 3-dimentional structure of the porous body to generate data indicating at least a pressure distribution of a fluid in a flow path in the porous body; and identifying a valid flow path that allows the fluid to flow from the inflow surface to the outflow surface based on a gradient of pressure values along a flow direction of the fluid in the flow path.

20 Claims, 14 Drawing Sheets

(51) Int. Cl.
*G01N 23/04* (2018.01)
*B01D 46/24* (2006.01)

(52) U.S. Cl.
CPC ... *G01N 2015/084* (2013.01); *G01N 2223/04* (2013.01); *G01N 2223/419* (2013.01)

(58) Field of Classification Search
CPC ............ B01D 46/2418; B01D 2273/18; C04B 38/0006
See application file for complete search history.

(56) References Cited

U.S. PATENT DOCUMENTS

| | | | |
|---|---|---|---|
| 2015/0273380 | A1 | 10/2015 | Sakashita et al. |
| 2016/0307318 | A1 | 10/2016 | Sakai et al. |
| 2017/0132781 | A1* | 5/2017 | Roth ............... G01N 33/241 |

FOREIGN PATENT DOCUMENTS

| | | |
|---|---|---|
| JP | 2015-189666 A1 | 11/2015 |
| JP | 2016-199450 A1 | 12/2016 |
| WO | 2013/146498 A1 | 10/2013 |

OTHER PUBLICATIONS

Japanese Patent Publication No. 2015-189666 A1 (Ref. AI) is discussed at paragraph [0003] of the present specification and corresponds to U.S. Patent Application Publication No. 2015/0273380 A1 (Ref. AD).

Japanese Patent Publication No. 2013-053589 A1 (Ref. AJ) is discussed at paragraph [0004] of the present specification and corresponds to U.S. Patent Application Publication No. 2013/0058839 A1 (Ref. AE).

Fumihiro Ochi, et al., "Simulation on Flow in Porous Media with Soot Deposition," *Journal of Japan Society of Fluid Mechanics*, 2005, vol. 24, pp. 535-541.

Bernsdorf, Jorg, non-official translation, Method Chemical Engineering/ Applications to Medical Physics, *Journal of the Japan Society for Computational Engineering and Science*, 2009, vol. 14, No. 3, pp. 2124-2129.

Kazuhiro Yamamoto, et al., "Simulation of Flow and Heat Transfer in Diesel Particulate Filter," *Thermal Issues in Emerging Technologies*, 2008, Second International Conference on Thermal Issues in Emerging Technologies, Dec. 17, 2008, pp. 231-236.

International Search Report and Written Opinion (Application No. PCT/JP2018/016488) dated Jul. 10, 2018.

* cited by examiner

[Fig. 1]
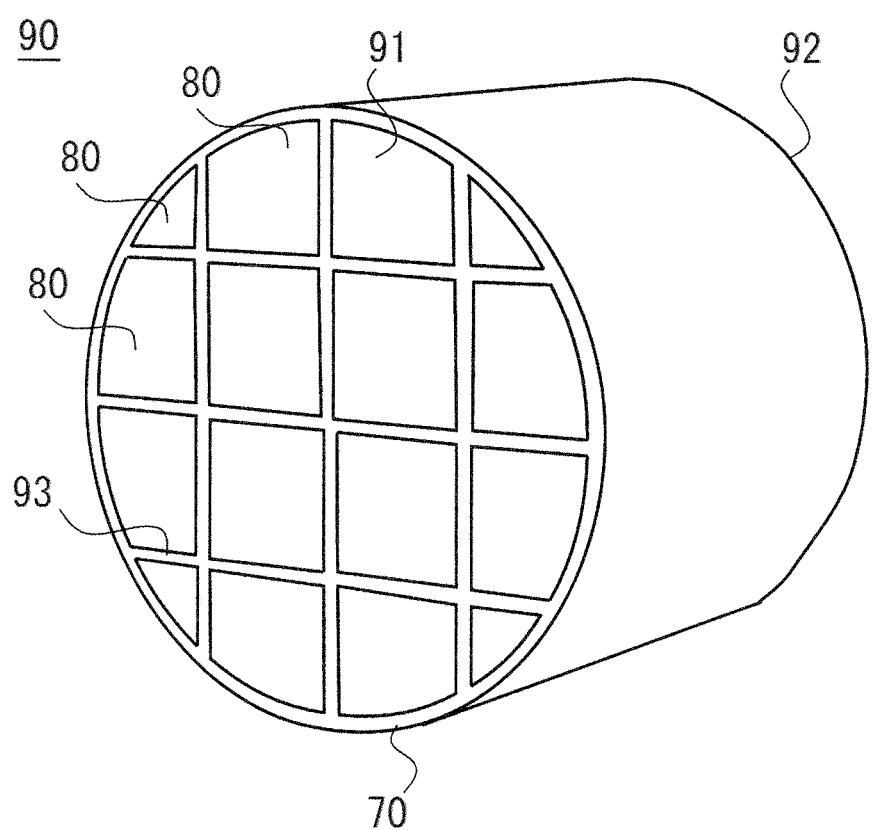

[Fig. 2]
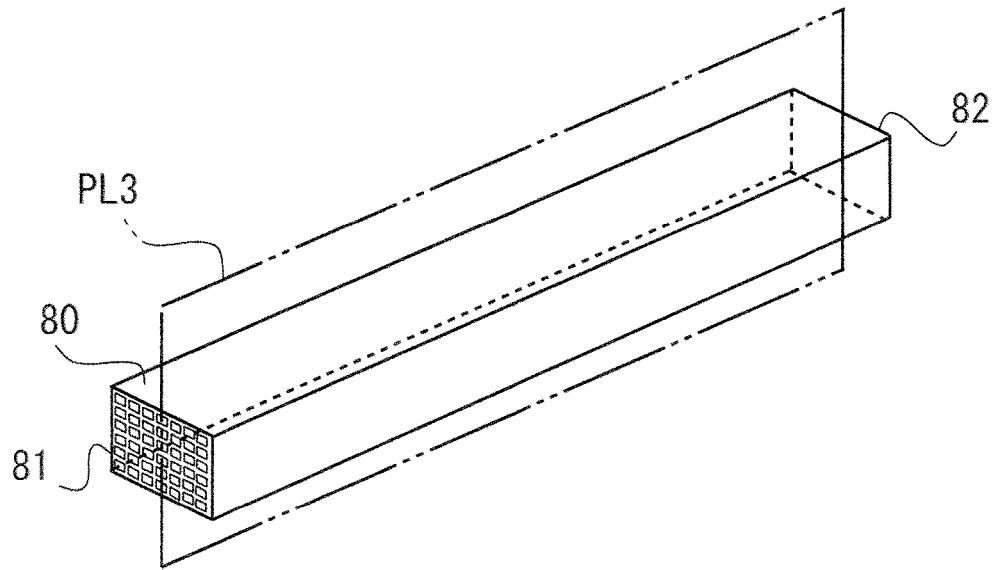
[Fig. 3]
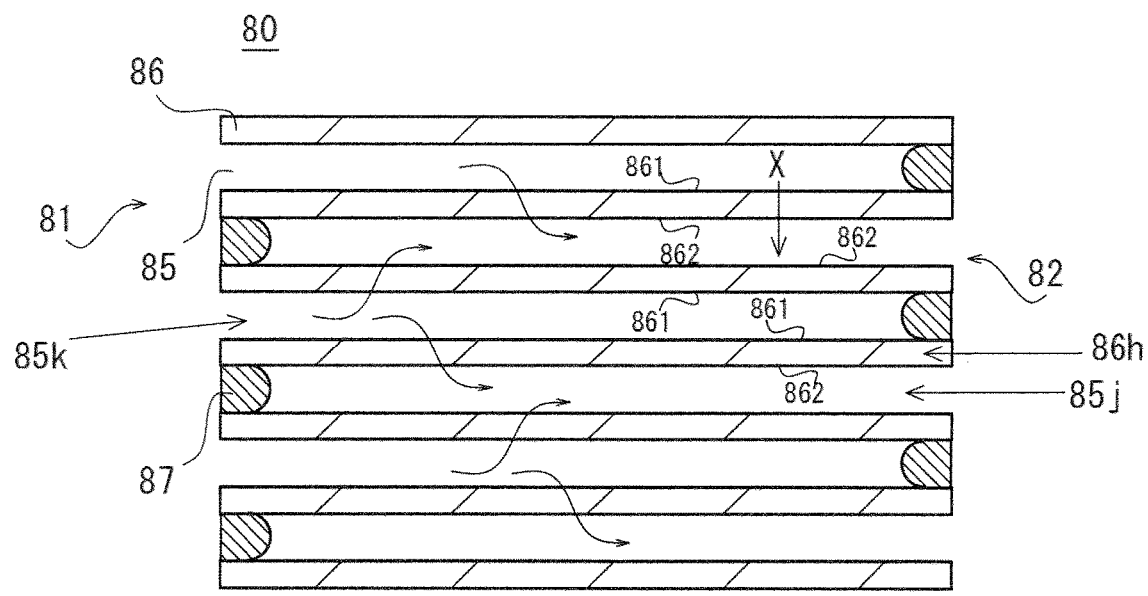

[Fig. 4]
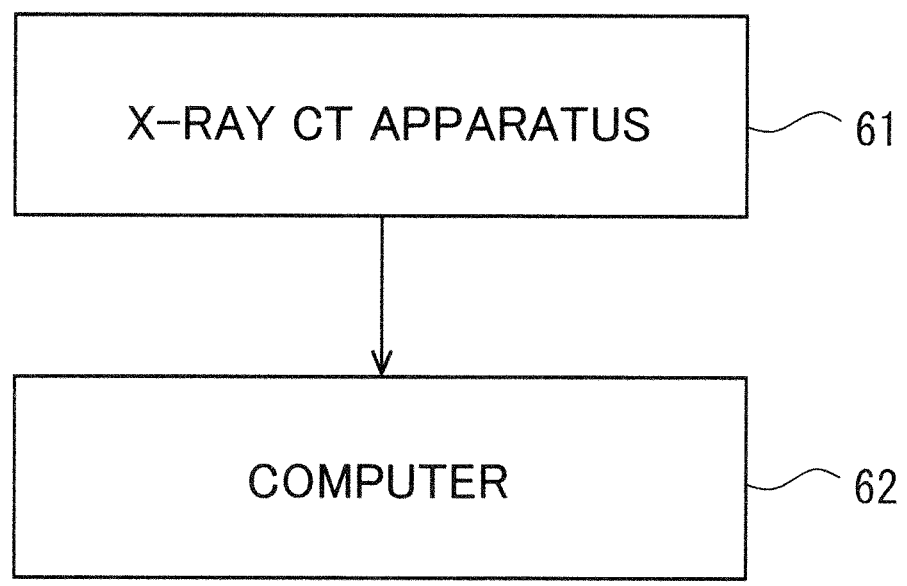

[Fig. 5]
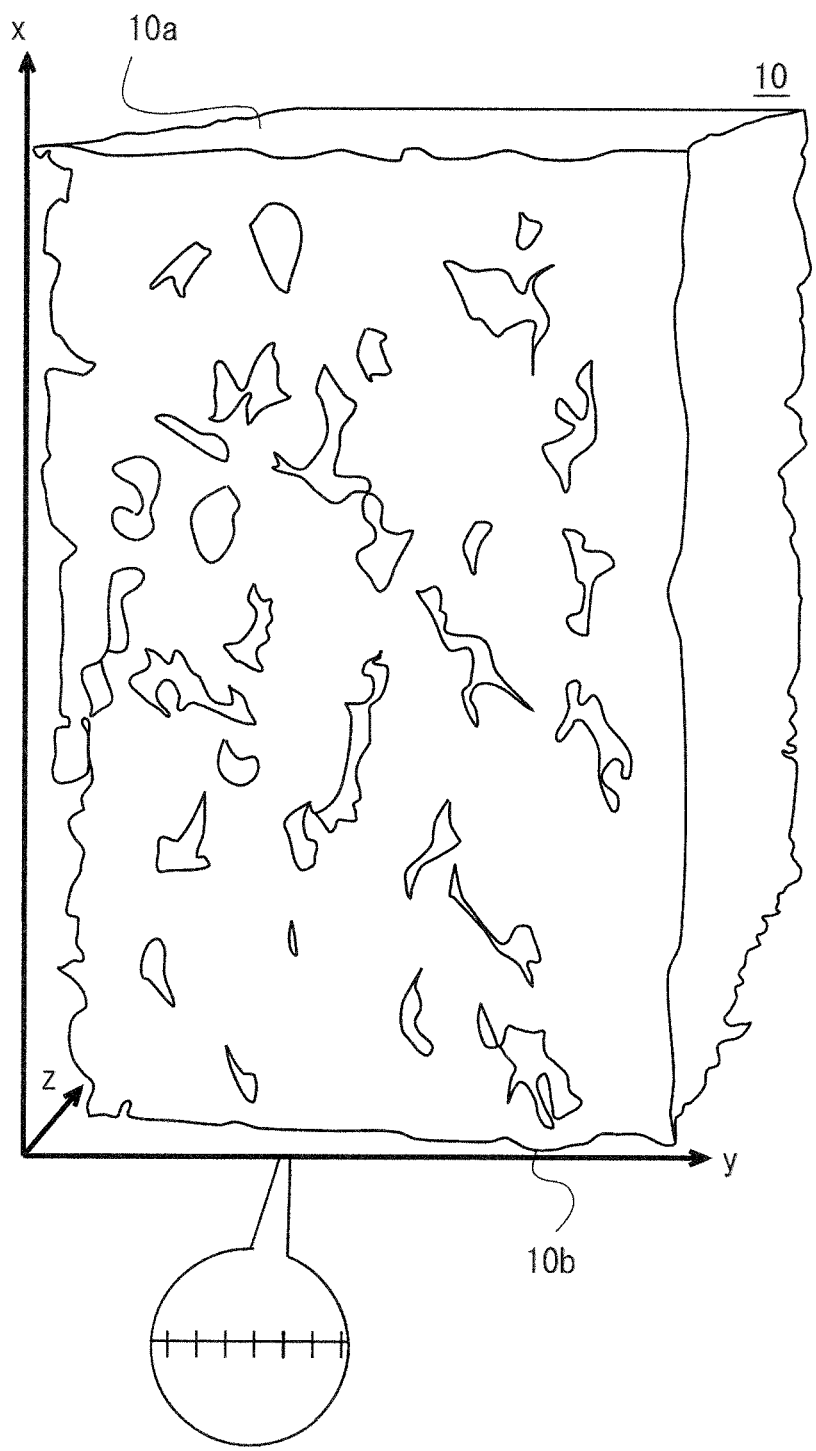

[Fig. 6]
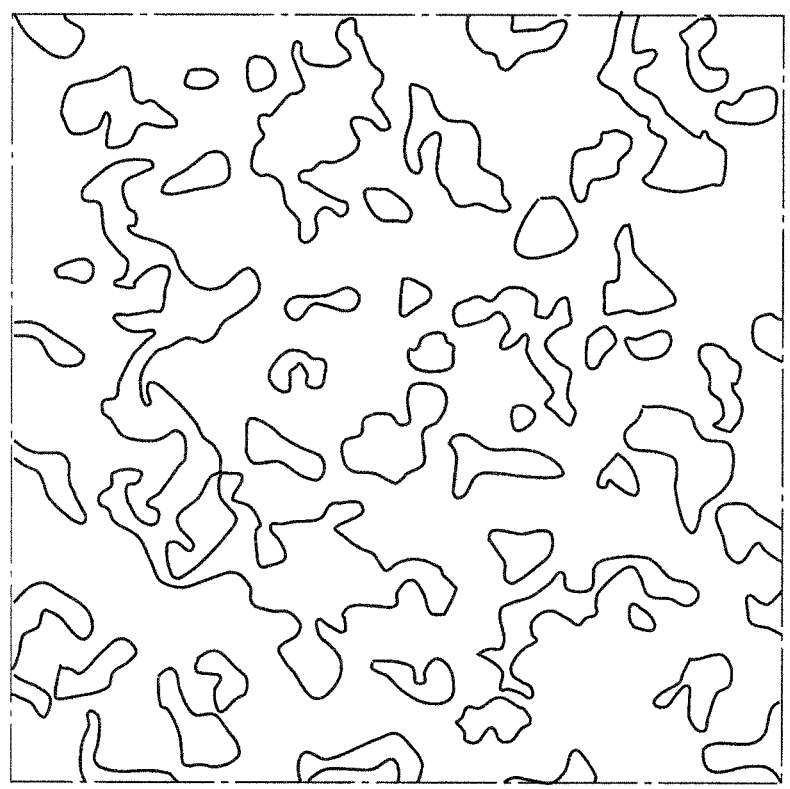
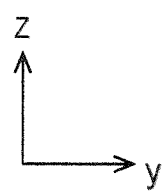

[Fig. 7]
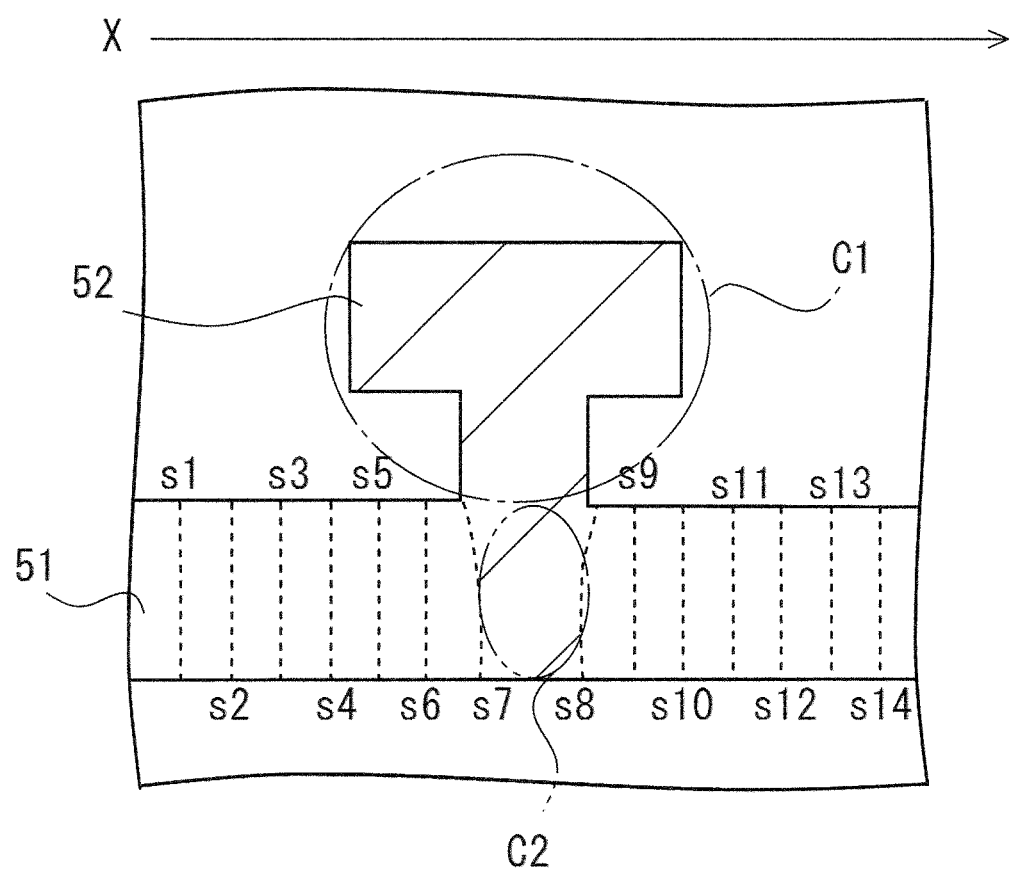

[Fig. 8]
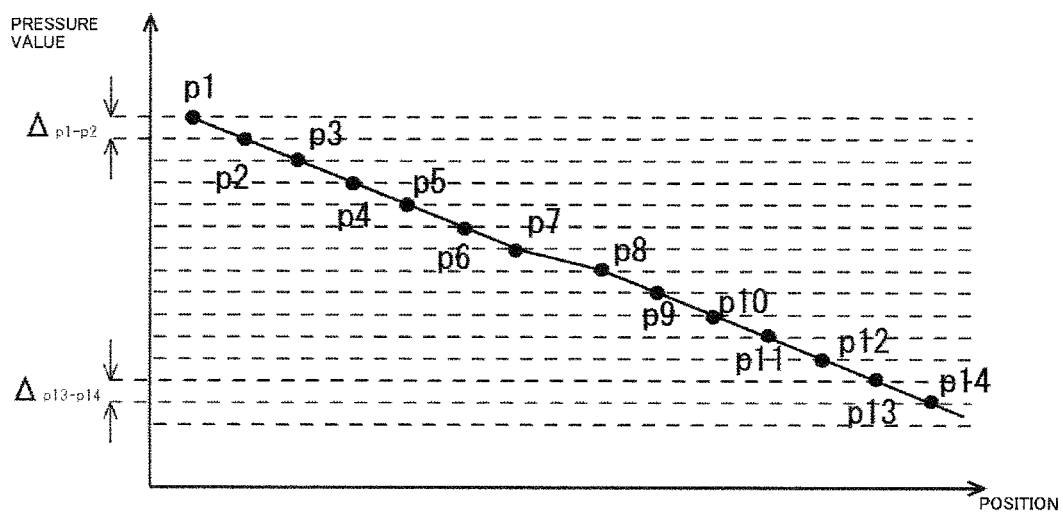

[Fig. 9]
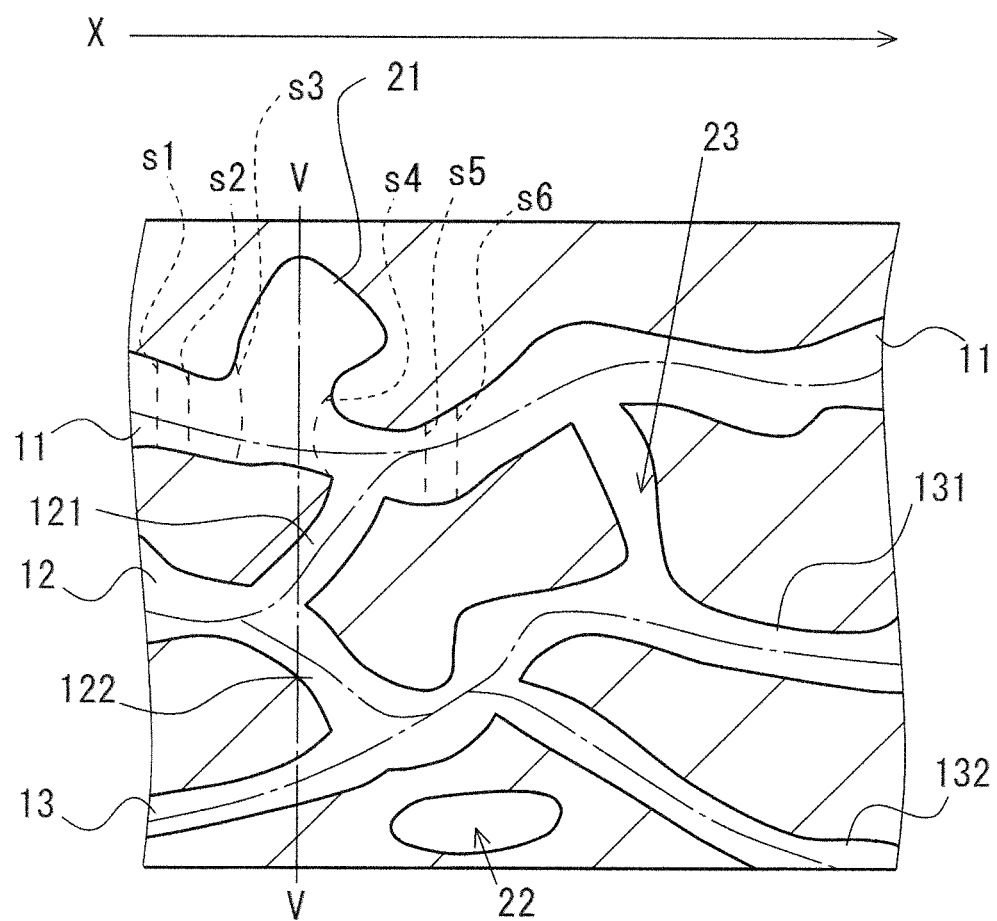

[Fig. 10]
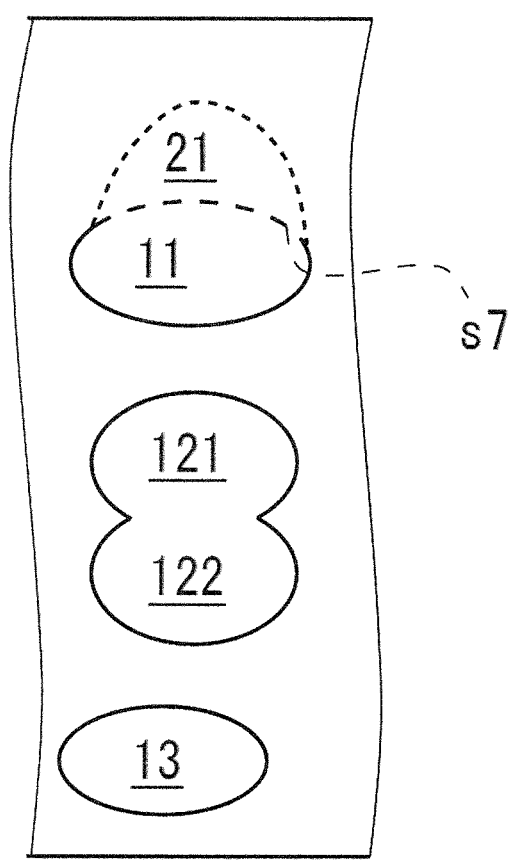

[Fig. 11]
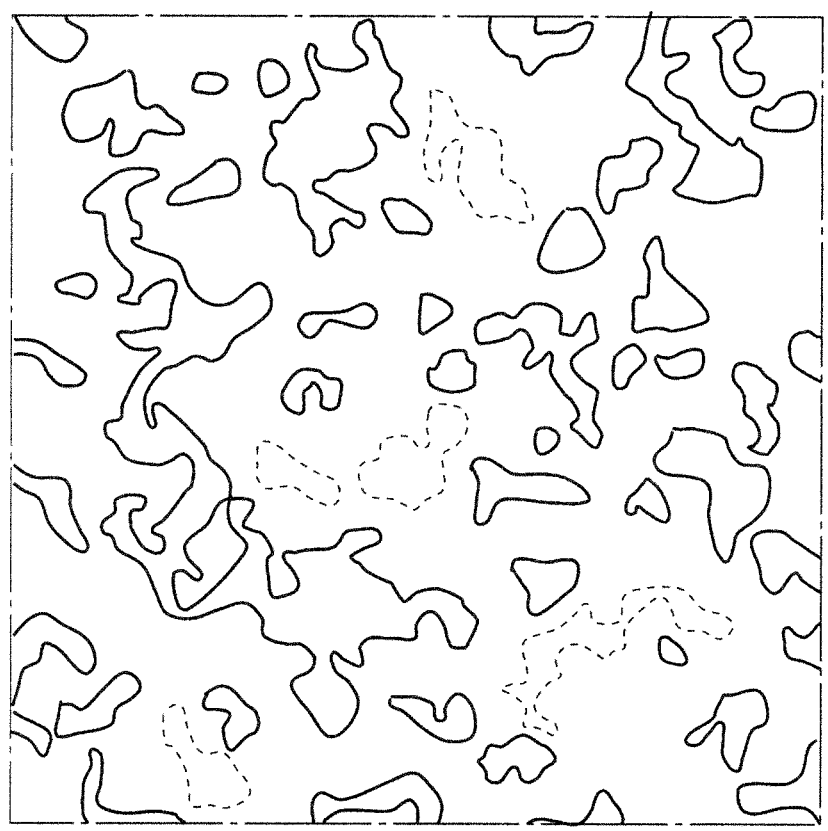
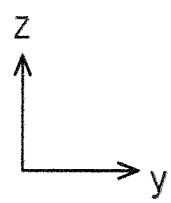

[Fig. 12]
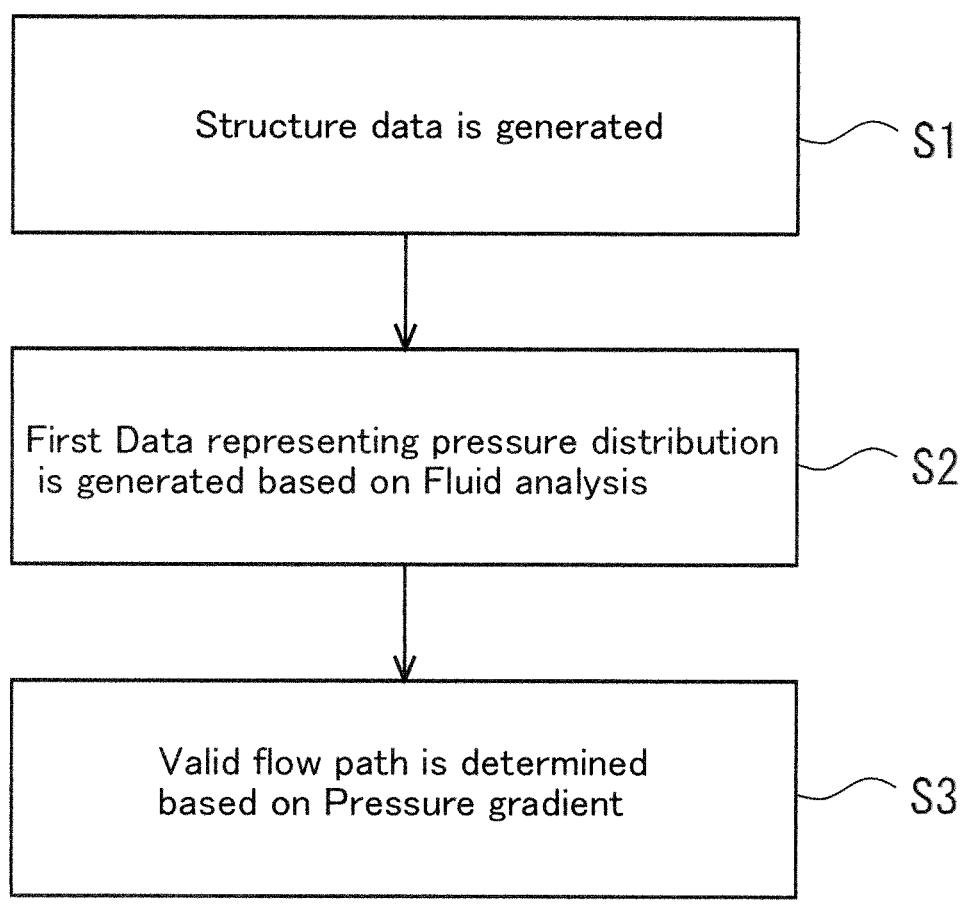

[Fig. 13]
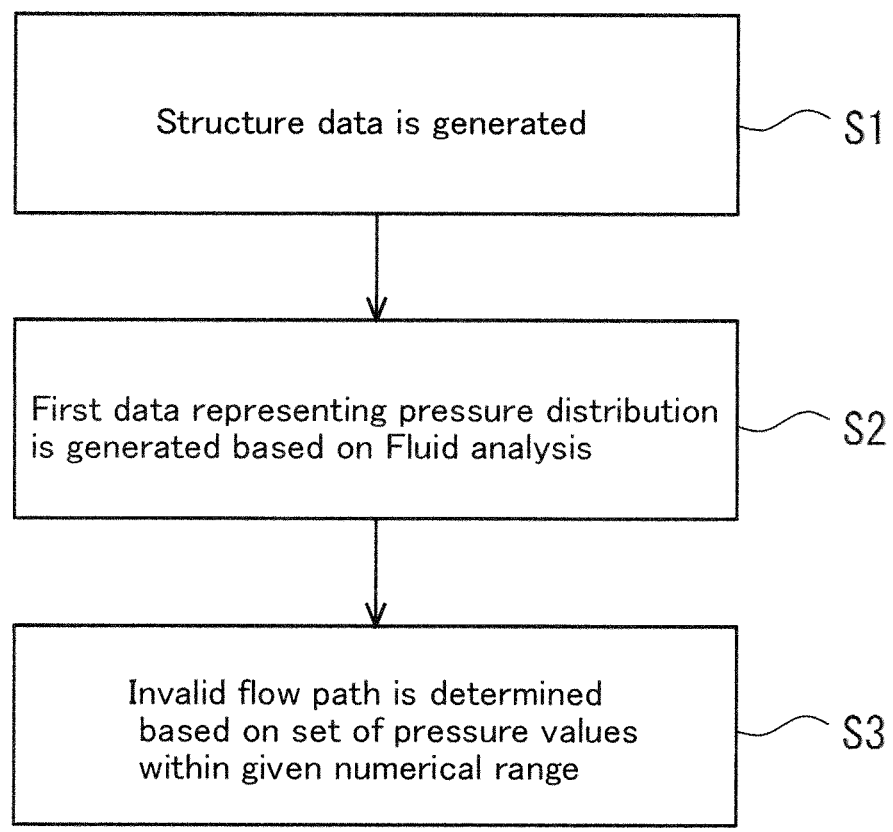

[Fig. 14]
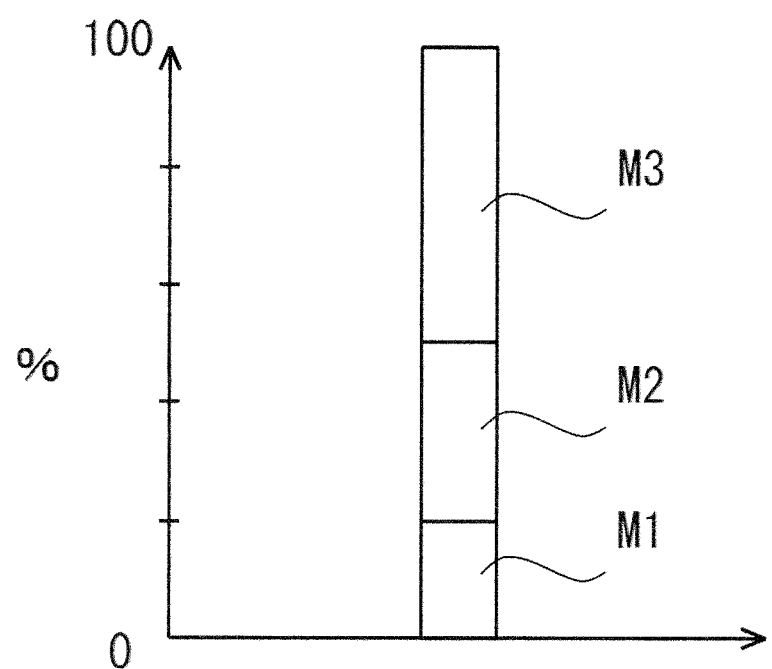

[Fig. 15]
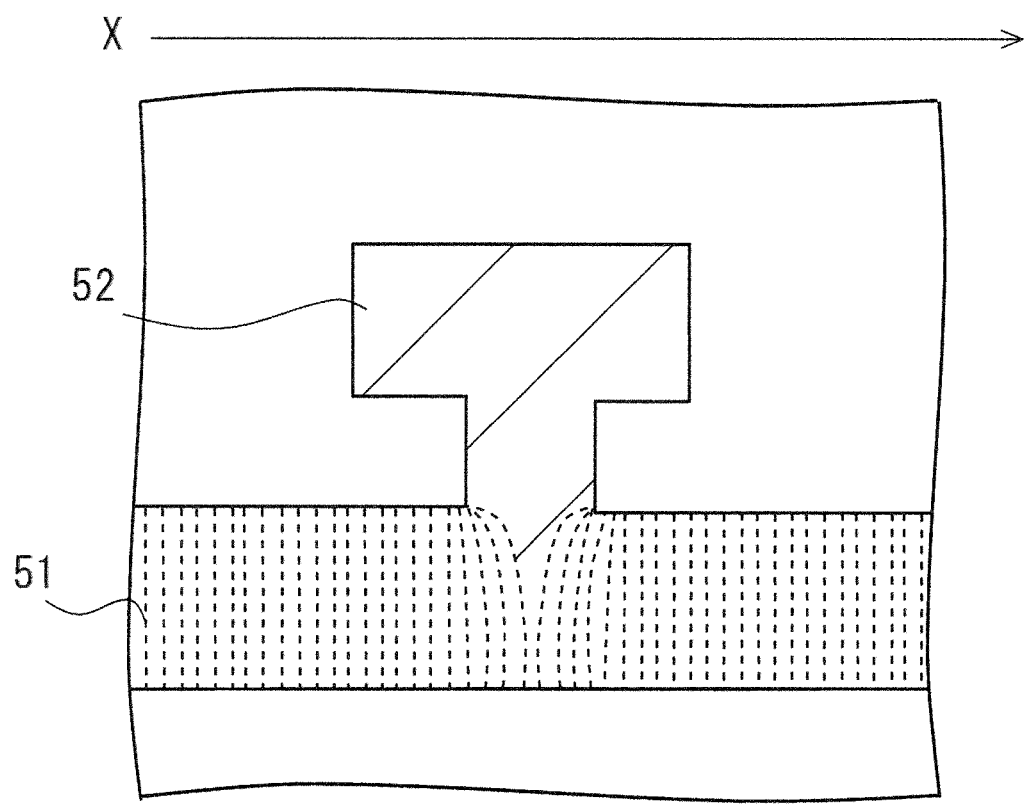

METHOD AND APPARATUS FOR IDENTIFYING VALID OR INVALID FLOW PATH

CROSS-REFERENCE TO RELATED APPLICATION

The present application is a continuation of PCT International Application PCT/JP2018/016488 filed on Apr. 23, 2018. The disclosures of this application including the specifications, the drawings, and the claims are hereby incorporated by reference in its entirety.

FIELD OF THE INVENTION

The present disclosure relates to methods and apparatuses for identifying valid or invalid flow path.

BACKGROUND

Japanese Patent Application Laid-open No. 2015-189666 discloses that, in order to balance smaller porosity in a porous body and higher permeability of the porous body, fluid analysis is performed based on artificial porous body data to calculate information regarding flow velocity in a respective spatial voxel. Japanese Patent Application Laid-open No. 2015-189666 discloses that a priority is placed to replace spatial voxels presenting a lower flow velocity with solid voxels so that a target value of porosity is achieved.

Japanese Patent Application Laid-open No. 2013-53589 discloses that pore diameters are observed based on a SEM image with respect to a wall-flow-type exhaust gas purification filter (See FIG. 4 of Japanese Patent Application Laid-open No. 2013-53589).

SUMMARY

The present inventors have newly identified a benefit of distinguishing, from other flow paths, valid flow paths that allow a fluid to flow from an inflow surface to an outflow surface, enabling more precise evaluation of performance of the porous body.

A method according to an aspect of the present disclosure may include: performing fluid analysis of a porous body, which is ought to have inflow surface and outflow surface, based on structure data representing a 3-dimentional structure of the porous body to generate data indicating at least a pressure distribution of a fluid in a flow path in the porous body; and identifying a valid flow path that allows the fluid to flow from the inflow surface to the outflow surface based on a gradient of pressure values along a flow direction of the fluid in the flow path.

In some cases, the valid flow path is identified based on plural isobaric surfaces that have different pressure values along the flow direction of the fluid in the flow path.

In some cases, a cross-sectional area of the valid flow path is determined based on the isobaric surface.

In some cases, a volume of the valid flow path is determined based on the isobaric surfaces.

In some cases, a partial volume of the valid flow path is determined based on, at least, a distance between first and second isobaric surfaces in the flow direction of the fluid and an area of the first and/or second isobaric surface.

In some cases, the method further includes determining a ratio of a sum of respective cross-sectional areas of the valid flow paths in a given cross-section of the porous body to a sum of respective cross-sectional areas of pores in the given cross-section of the porous body.

In some cases, the method further includes determining a ratio of a volume of the valid flow path to a total volume of pores in the porous body.

In some cases, the method further includes determining a ratio of a sum of cross-sectional areas of the valid flow paths in a given cross-section of the porous body to a sum of cross-sectional areas of both of pores and ceramics portions in the given cross-section of the porous body.

In some cases, the method further includes determining a ratio of a volume of the valid flow path to a volume of the porous body.

In some cases, the method further includes determining an equivalent diameter of the isobaric surface based on an area and a perimeter length of the isobaric surface.

In some cases, the method further includes determining a distribution of equivalent diameters.

In some cases, the method further includes determining a distribution of the number of the isobaric surfaces having equivalent diameters of the same value or within the same numerical range.

In some cases, said data also indicates a distribution of flow velocity of the fluid flowing through the flow path, and the method further includes determining a flow rate of the fluid passing an isobaric surface in a given time window based on a flow velocity indicated by said data and an area of the isobaric surface in which equal pressure values are distributed so as to cross the flow direction of the fluid in the valid flow path.

In some cases, the method further includes determining a flow rate of the fluid flowing through a part of or an entirety of the valid flow paths in the porous body based on a sum of the flow rates determined for the respective isobaric surfaces.

In some cases, the method further include determining, for the isobaric surface, an evaluation value regarding filtering characteristic based on the flow rate determined for the isobaric surface.

In some cases, the structure data is a 3-dimentional set of voxels that have digital values.

In some cases, the method further includes setting lattice points to the structure data, and wherein a distance between isobaric surfaces that have different pressure values along the flow direction of the fluid in the flow path includes a distance that is less than a lattice interval in the structure data.

An apparatus according to an aspect of the present disclosure may be configured to: perform fluid analysis of a porous body, which is ought to have inflow surface and outflow surface, based on structure data representing a 3-dimentional structure of the porous body to generate data indicating at least a pressure distribution of a fluid in a flow path in the porous body; and identify a valid flow path that allows a fluid to flow from the inflow surface to the outflow surface based on a gradient of pressure values along a flow direction of the fluid in the flow path.

A method according to an aspect of the present disclosure may include: performing fluid analysis of a porous body, which is ought to have inflow surface and outflow surface, based on structure data representing a 3-dimentional structure of the porous body to generate data indicating at least a pressure distribution of a fluid in a flow path in the porous body; and identifying an invalid flow path that does not allow the fluid to flow from the inflow surface to the outflow surface based on a set of pressure values within a given numerical range indicating no flow of the fluid in the flow path.

An apparatus according to an aspect of the present disclosure may be configured to: perform fluid analysis of a porous body, which is ought to have inflow surface and outflow surface, based on structure data representing a 3-dimentional structure of the porous body to generate data indicating at least a pressure distribution of a fluid in a flow path in the porous body; and identify an invalid flow path that does not allow the fluid to flow from the inflow surface to the outflow surface based on a set of pressure values within a given numerical range indicating no flow of the fluid in the flow path.

According to an aspect of the present disclosure, valid flow paths that allows a fluid to flow from an inflow surface to an outflow surface and/or invalid flow paths that does not allow a fluid to flow from an inflow surface to an outflow surface may be identified.

BRIEF DESCRIPTION OF THE DRAWINGS

Hereinafter, non-limiting embodiments of the present invention will be described with reference to FIGS. 1 to 15:

FIG. 1 is a schematic perspective view of a ceramics filter according to an aspect of the present disclosure;

FIG. 2 is a schematic perspective view of a segment in a ceramics filter according to an aspect of the present disclosure;

FIG. 3 is a view showing a schematic cross-section of a segment taken in a plane PL3 in FIG. 2. In first and second ends of honeycomb body having cells defined by porous cell-walls, the cells are complementary sealed by sealing portions. Fluid can flow between adjacent cells through a porous cell-wall defining the cells;

FIG. 4 is a schematic block diagram of a system for embodying a method of the present disclosure;

FIG. 5 is a schematic perspective view of a porous body represented based on a structure data produced by an X-ray CT apparatus;

FIG. 6 is a view showing a schematic partial cross-section of the porous body illustrated in FIG. 5, a region surrounded by a solid line showing a pore;

FIG. 7 is a diagram showing a result of fluid analysis performed for a simplified flow path;

FIG. 8 is a graph of varying pressure values in isobaric surfaces illustrated in FIG. 7;

FIG. 9 is a schematic diagram mainly illustrating flow paths in a porous body;

FIG. 10 is a reference diagram schematically illustrating a boundary between a valid flow path and an invalid flow path in a cross-section V-V in FIG. 9;

FIG. 11 is a diagram showing a schematic partial cross-section of the porous body illustrated in FIG. 5, wherein a solid line indicates a pore which is a partial space of a valid flow path and a dotted line indicates a pore which is a partial space of an invalid flow path;

FIG. 12 is a schematic flowchart for a method of identifying valid flow paths according to the present disclosure;

FIG. 13 is a schematic flowchart for a method of identifying invalid flow paths according to the present disclosure;

FIG. 14 is a graph illustrating a ratio of ceramics portion, valid pore, and invalid pore; and FIG. 15 is a diagram showing a case where difference ΔP is set smaller by which an interval of isobaric surface is determined.

DETAILED DESCRIPTION OF THE INVENTION

A skilled person would be able to combine respective embodiments and/or respective features in the respective embodiments without requiring excess descriptions. Also, a skilled person would be able to appreciate synergistic effects of such combinations. Overlapping descriptions among the embodiments would be basically omitted. Referenced drawings are prepared mainly for a purpose of illustration of invention, and may possibly be simplified for the sake of convenience of illustration. Respective features highlighted by the expression "In some cases" would be understood as universal feature effective not only to method and/or apparatus of the present disclosure but also to various other methods and/or apparatuses.

Ceramics filter 90 illustrated in FIG. 1 is a functional element for filtering a fluid such as gas, liquid, powder or a mixture of any combination thereof. Fluid flowing through the ceramics filter 90 is typically an exhaust gas discharged from engine. The ceramics filter 90 is used to purify the exhaust gas discharged from engine such as gasoline engine and diesel engine, not necessarily limited to this though. In particular, the ceramics filter 90 captures particulate matter in exhaust gas. The captured particulate matter will burn and be removed in the ceramics filter 90.

The ceramics filter 90 is a cylinder provided with an inflow surface 91 and an outflow surface 92 arranged opposite to the inflow surface 91. The ceramics filter 90 is not necessarily a cylinder and may take other shapes. The ceramics filter 90 is assembled from plural segments 80, but should not be limited to this. Envisioned is a case where the ceramics filter 90 is a monolithic body. A case of the ceramics filter 90 assembled from plural segments 80 is further described with no intention of limiting, the number of the segments 80 may be varied in accordance with a size of the ceramics filter 90. Ceramics intermediate layers 93 are formed between the segments 80, facilitating the integration/association of the segments 80. Note that a method of assembling a ceramics filter 90 from segments 80 is known in this art, thus detail description is omitted.

In a case where a ceramics filter 90 is assembled from plural segments 80, as illustrated in FIGS. 2 and 3, the segment 80 is a rectangular prism provided with inflow surface 81 and outflow surface 82. The segment 80 is not necessarily limited to a rectangular prism and may take other shapes. The segment 80 has porous cell-walls 86 defining cells 85 through which a fluid flows, and sealing portions 87 arranged to allow the fluid to flow between adjacent cells 85 through porous cell-wall 86. As would be well understood from FIG. 3, a pattern of the sealing portions 87 at the inflow surface 81 of the segment 80 and a pattern of the sealing portions 87 at the outflow surface 82 of the segment 80 are complementary. In other words, a cell 85 having an open end at the inflow surface 81 which is not sealed by a sealing portion 87 has an open end at the outflow surface 82 which is sealed by a sealing portion 87. The cell 85 with its open end at the inflow surface 81 sealed by the sealing portion 87 has an open end at the outflow surface 82 not sealed by the sealing portion 87. Such arrangement of the sealing portions 87 allows a fluid to flow through the porous cell-wall 86 as schematically illustrated in FIG. 3. From a view point of such a flow of fluid through the porous cell-wall 86, the ceramics filter 90 or the segment 80 are referred to as "wall-through type".

The ceramics filter 90 or the segment 80 included therein are made of ceramic material such as silicon carbide (SiC), cordierite ($2MgO \cdot 2Al_2O_3 \cdot 5SiO_2$), Aluminum titanate ($Al_2TiO_5$). Chemical bond of silicon carbide (SiC) may be a Si-bond or SiC-bond or Cordierite-bond or the like. Open end shape of the cell 85 should not be limited to rectangle and may take other various polygonal shapes such as hexagon. Thickness of the cell-wall 86 and density of cell 85 may be set appropriately in accordance with its usage or desired property. Method of producing a segment 80 is widely known in the art, and its description is omitted.

Fluid flows between the adjacent cells 85 through the above-described porous cell-wall 86 (particularly, a portion thereof). In particular, as shown in FIG. 3, the exhaust gas in a cell 85k would flow out through the porous cell-wall 86h into a cell 85j. The porous cell-wall 86h has an inflow surface 861 and an outflow surface 862 arranged opposite to the inflow surface 861. The porous cell-wall 86 includes valid flow paths allowing the exhaust gas to flow from the inflow surface 861 to the outflow surface 862. The exhaust gas, having flowed into the cell-wall 86 through the inflow surface 861, would reach the outflow surface 862 via the valid flow path. Note that particulate matter in the exhaust gas may be accumulated and burn in the valid flow path of the cell-wall 86. Hereinafter, the porous cell-wall 86 may be simply referred to as a porous body.

A porous body of the porous cell-wall 86 is subjected to a presently disclosed method of identifying valid (effective) or invalid (ineffective) flow paths so that valid or invalid flow paths in the porous body would be identified. However, it should be noted that the presently disclosed method of identifying valid or invalid flow paths should not be limited to the porous body of the porous cell-wall 86 of the segment 80 in the ceramics filter 90, but will be usable for any porous bodies to be embedded in various other products or used in other various applications. In some cases, the porous body is a cell-wall of a monolithic cordierite honeycomb body not of a segment structure, the entire content of Japanese patent application laid-open No. 2016-175045 (Title "Honeycomb body with sealed cells"; and date of application Mar. 20, 2015) being incorporated herein by reference. Porous body subjected to the presently disclosed method of identifying valid or invalid flow paths should not be limited to a filter but may be used in various applications such as a carrier substrate, heat insulator, straightening vane, selective permeable layer or heat exchanger.

Presently disclosed method of identifying valid or invalid flow paths is performed based on structure data which represents a 3-dimensional structure of a porous body which ought to have inflow and outflow surfaces. The structure data representing 3-dimensional structure of porous body can be produced through various methods. Use of structure data with higher resolution is recommendable in order to reveal the structure of the porous body more precisely. From such a viewpoint, the structure data representing 3-dimensional structure of porous body is generated by an X-ray CT (Computed Tomography) apparatus 61, not necessarily limited to this though. The structure data produced by the X-ray CT apparatus 61 is used by a computer 62 (See FIG. 4). Again, embodiments are envisioned where the structure data representing 3-dimensional structure of porous body is generated through other methods without using the X-ray CT apparatus.

FIG. 5 is a schematic perspective view of a porous body represented by a structure data produced by the X-ray CT apparatus. FIG. 6 is a view showing a schematic partial cross-section of the porous body illustrated in FIG. 5, a region surrounded by a solid line showing a pore. As would be well understood from FIG. 6, the pores having various cross-sectional shapes are provided in a cross-section of the porous body 10. The present inventors assume that some pores are partial spaces of valid flow paths that allow the fluid to flow from the inflow surface 10a to the outflow surface 10b of the porous body 10, but not all pores are partial spaces of the valid flow paths. In particular, it is envisioned that the pores include isolated pore(s) not in spatial communication with the valid flow path(s). Also, it is envisioned that there is a pore that is a partial space of an invalid flow path that is partially or wholly occupied by a fluid but does not allow the fluid to flow there-through. The valid flow path and the invalid flow path can be differentiated based on determining whether a flow path is contributing in flowing a fluid from the inflow surface 10a to an outflow surface 10b or not. Selective identification of valid flow paths in the porous body 10 allows evaluation of the porous body 10 from a higher level or different perspective. Result of such evaluation of the porous body 10 might be valuable information which contributes in designing and manufacturing future porous bodies 10.

X-ray CT apparatus 61 irradiates X-rays to a porous body which is a workpiece, and observes the intensity of X-ray transmitted through the porous body. The porous body (workpiece) rotates between X-ray source and X-ray detector. In other instances, each of the X-ray source and the X-ray detector may rotate around the porous body. Reconstruction is performed based on images of X-ray intensity distribution captured by the X-ray detector to generate a structure data representing a 3-dimensional structure of the porous body. In some cases, the structure data is a 3-dimentional set of voxels wherein each of the voxels has a voxel value (digital value) representing an X-ray absorption ratio. In a case where the porous body consists of a ceramics portion and pores, a voxel value of a voxel corresponding to the ceramics portion (hereinafter referred to as "ceramics voxel") and a voxel value of a voxel corresponding to the pore (hereinafter referred to as "pore voxel") are largely different. The ceramics portion is a solid portion of ceramic material. The pore is a portion where a gas exists. Format and structure of Data could be variously determined, and should not be limited to a particular type.

Note that the porous body may have, additionally to the ceramics portion and the pores, a residual of carbon (Carbon) which is caused in a method of manufacturing the segment 80. The porous body may include carbon content originated from PM in the exhaust gas. The porous body may include carbon content of ash originated from fuel or engine oil. The porous body may include, additionally to the ceramics portion and the pores, catalysts borne by the segment 80, i.e. the cell-wall 86. These residual of carbon and the catalyst are considered to have an X-ray absorption coefficient different from that of the ceramics portion and the pore. Therefore, the voxel value of the voxel corresponding to these material is considered to have a value different from a voxel value of the ceramics or pore voxel. Note that, a variously configured traditional or new X-ray CT apparatus can be employed as the X-ray CT apparatus 61. For example, the X-ray CT apparatus 61 is a non-helical scan type or a helical scan type.

Computer 62 performs fluid analysis of the porous body 10, which is ought to have the inflow surface 10a and the outflow surface 10b, based on the structure data representing a 3-dimentional structure of the porous body 10 to generate data indicating at least a pressure distribution of the fluid in a flow path in the porous body 10. Fluid analysis is a simulation in which the computer 62 solves equation(s) regarding fluid motion. Various fluid analysis methods such as Difference Method, Finite Volume Method, Finite Element Method, Particle Method, Lattice Boltzmann Method and the like can be employed. If Lattice Method such as Lattice Boltzmann Method is used, a computational lattice (can be referred to as grid or mesh) is set onto the structure data. Note that, in Particle Method, a computational lattice is not set but a pressure distribution can be calculated out similarly as described below. Computer 62 sets lattice points to the voxels respectively. Lattice point is positioned at the center of the voxel, for example. Lattice points allocated to the voxels are represented by xyz coordinates, for example (See FIG. 5). It is not necessary to allocate a lattice point to every voxel in the set of voxels. It is envisioned that the number of lattice points is less than the number of voxels in order to reduce the calculation cost the computer 62 bears. The number of lattice points may be greater than the number of voxels in order to allow more precise observation of the porous body 10. Note that, a partially enlarged view in FIG. 5 schematically shows a lattice interval (grid interval) along the Y-axis. Lattice interval along X-axis=Lattice interval along Y-axis=Lattice interval along Z-axis is satisfied, not necessarily limited to this though.

Fluid analysis itself such as Lattice Boltzmann Method can be performed by an application program (software program) installed on the computer 62, and therefore detail description of particular methods of the fluid analysis will be omitted. As a result of fluid analysis such as Lattice Boltzmann Method, values of flow velocity, pressure and density are calculated for each lattice point (if lattice points are set). Embodiment is envisioned where one or more of the values of flow velocity, pressure and density are selectively calculated.

Data representing a pressure distribution of fluid obtained as an outcome of the fluid analysis is a set of pressure values. If computational lattice is set, the data representing a pressure distribution of fluid obtained as an outcome of the fluid analysis is a set of pressure values at respective lattice points. As no fluid flows at a lattice point corresponding to a ceramics voxel, a pressure value at that lattice point would be no value, or zero, or error value output through the fluid analysis (e.g. a clearly incorrect value such as an initial pressure value of fluid at the inflow surface). Lattice point corresponding to a pore voxel which is a partial space of a valid flow path has a given pressure value. Lattice point corresponding to a pore voxel which is a partial space of invalid flow path also has a given pressure value. Lattice point corresponding to the pore voxel into which a fluid does not flow has a pressure value indicating zero or error value. Error values can be eliminated easily using a threshold.

Next, the computer 62 identifies a valid flow path, which allows a fluid to flow from the inflow surface 10a to the outflow surface 10b, based on a gradient of the pressure values along a flow direction of the fluid in the flow path of the porous body 10. The fluid, when flowing through a valid flow path allowing a fluid to flow from the inflow surface 10a to the outflow surface 10b, receives resistance from a wall surface defining a flow path and the pressure value decreases continuously. The gradient of the pressure value can be determined by comparing respective pressure values at two or more lattice points which are spatially adjacent. Note that, this should be not limited to compare pressure values at adjacent lattice points with a minimum lattice interval. A set of pressure values which change continuously along a flow direction of fluid or a set of lattice points having such pressure values would correspond to a valid flow path (or a part thereof). In contrast, a set of pressure values which do not change continuously along a flow direction of fluid or a set of lattice points having such pressure values would correspond to an invalid flow path (or a part thereof). Note that the flow direction of fluid should not be limited to a direction orthogonal to the inflow surface 861 and the outflow surface 862. Note that the set of pressure values which do not change continuously along the flow direction of fluid can be replaced with a set of constant pressure values which do not show a flow of fluid.

FIG. 7 is a diagram showing a result of fluid analysis done for a simplified flow path. FIG. 8 is a graph of varying pressure values in isobaric surfaces illustrated in FIG. 7. In some cases, the valid flow path is identified based on plural isobaric surfaces that have different pressure values along the flow direction of the fluid in the flow path, not necessarily limited to this though. Plural isobaric surfaces are arranged in accordance with the gradient of the pressure values along the flow direction of the fluid in the flow path. The isobaric surface is a surface that has equal pressure values and is determined based on the pressure gradient through the processing of fluid analysis application program. For example, the application program sets the isobaric surfaces based on difference $\Delta P$ of pressure value. The isobaric surface is a surface in which equal pressure values are distributed so as to cross the flow direction of the fluid (X-direction in FIG. 7). The isobaric surface may be a flat surface orthogonal to the flow direction of the fluid or partially or wholly curved surface crossing the flow direction of the fluid, but should not be limited to these surfaces.

Interval of the isobaric surfaces is set based on the difference $\Delta P$ of the pressure values, and therefore the distance of the isobaric surfaces adjacent along the flow direction of the fluid would change in accordance with the degree of the gradient of the pressure values of the fluid flowing through the flow path. It is envisioned that there are plural lattice points between adjacent isobaric surfaces in a flow path in which the gradient of the pressure values of the fluid is moderate. In contrast, it is envisioned that, in accordance with a gradient of the pressure values of the fluid or an application program setting of the difference $\Delta P$ of the pressure value which determines the interval of the isobaric surfaces, a distance between adjacent isobaric surfaces is shorter than a lattice interval of the structure data.

In the cases of FIGS. 7 and 8, the following condition is satisfied: Pressure value p1 of the isobaric surface s1>Pressure value p2 of the isobaric surface s2>Pressure value p3 of the isobaric surface s3>Pressure value p4 of the isobaric surface s4>Pressure value p5 of the isobaric surface s5>Pressure value p6 of the isobaric surface s6>Pressure value p7 of the isobaric surface s7>Pressure value p8 of the isobaric surface s8>Pressure value p9 of the isobaric surface s9>Pressure value p10 of the isobaric surface s10>Pressure value p11 of the isobaric surface s11>Pressure value p12 of the isobaric surface s12>Pressure value p13 of the isobaric surface s13>Pressure value p14 of the isobaric surface s14. Note that, $\Delta_{p1-p2}=\Delta_{p2-p3}=\Delta_{p3-p4}=\Delta_{p4-p5}=\Delta_{p5-p6}=\Delta_{p6-p7}=\Delta_{p7-p8}=\Delta_{p8-p9}=\Delta_{p9-p10}=\Delta_{p10-p11}=\Delta_{p11-p12}=\Delta_{p12-p13}=\Delta_{p13-p14}$ is satisfied.

The flow path 51 shown in FIG. 7 is a valid flow path identified based on plural isobaric surfaces arranged in accordance with the gradient of the pressure values along the flow direction of the fluid in the flow path. In an invalid flow path designated by a dashed line circle C1, plural isobaric surfaces are not arranged along the invalid flow path unlike the valid flow path. Therefore, the invalid flow path identified by a dashed line circle C1 is eliminated.

The flow path 52 shown in FIG. 7 is an invalid flow path in which the fluid exists but the fluid does not flow. The location and area of this invalid flow path can be identified based on a set of pressure values in a given numerical range. In particular, as indicated by diagonal lines in FIG. 7, this can be identified based on a set of pressure values within a given numerical range regarding the difference ΔP of the pressure values by which the interval of the isobaric surfaces is determined. Note that, it is envisioned that this set of pressure values includes a portion of a valid flow path as pointed out by a phantom line circle C2 in FIG. 7. This error can be reduced by reducing the numerical range of the difference ΔP of the pressure values, by which the interval of the isobaric surfaces is determined, to reduce a portion of the valid flow path designated by the circle C2 (See FIG. 15). Additionally or alternatively, valid flow path may be identified based on flow velocity pattern, and overlapped portions of the invalid and valid flow paths may be eliminated.

FIG. 9 is a schematic diagram mainly illustrating flow paths in a porous body. FIG. 10 is a reference diagram schematically illustrating a boundary between a valid flow path and an invalid flow path in a cross-section V-V in FIG. 9. As would be understood from FIG. 9, plural flow paths are formed in the porous body 10 so as to have confluence points and diverting points. FIG. 9 is a two-dimensional depiction of the flow paths but the flow paths would be understood to be formed in a three-dimensional space. Likewise FIGS. 7 and 8, the first flow path 11 can be identified based on the isobaric surfaces s1 to s6. The same holds true for the second and third flow paths 12 and 13. The second flow path 12 bifurcates into sub flow paths 121 and 122, and the former merges with the first flow path 11 and the latter merges with the third flow path 13. The third flow path 13 bifurcates into sub flow paths 131 and 132.

Likewise FIGS. 7 and 8, the flow path 21, which is in spatial communication with the first flow path 11, can be identified as an invalid flow path based on equal pressure values (or an area thereof). A pore 22 positioned nearby the diverting point of the third flow path 13 is an isolated pore into which the fluid does not flow, with its pressure value=0 or with its pressure value indicating an error value. A flow path 23 between the first flow path 11 and the sub flow path 131 is illustrated just for a reference. The flow path 23 would be a valid flow path if there is a difference between a pressure value at a lattice point positioned at the flow path end at the side of the first flow path 11 and a pressure value at a lattice point positioned at the flow path end at the side of the sub flow path 131. The flow path 23 would be an invalid flow path if there is no difference between a pressure value at a lattice point positioned at the flow path end at the side of the first flow path 11 and a pressure value at a lattice point positioned at the flow path end at the side of the sub flow path 131.

Identifying a valid flow path based on isobaric surfaces facilitates identification of a valid flow path that is continuous in a 3-dimensional space, i.e. facilitates direct identification of position or area or distribution of the valid flow path in a 3-dimensional space. In a case where a valid flow path is identified based on the isobaric surfaces, a boundary s7 between the first flow path 11 and the flow path 21 can be virtually determined between the isobaric surface s3 and the isobaric surface s4 as shown in FIGS. 9 and 10.

FIG. 11 is a diagram showing a schematic partial cross-section of the porous body illustrated in FIG. 5, wherein a solid line indicates a pore which is a partial space of a newly identified valid flow path (hereinafter referred to as "valid pore") and a dotted line indicates a pore which is a partial space of a newly identified invalid flow path (hereinafter referred to as "invalid pore"). As would be understood from FIG. 11, according to the above-described presently disclosed method, it is possible to identify the valid flow paths and, additionally or alternatively the invalid flow paths. It would be possible to calculate a porosity regarding the valid pore or the invalid pore in a given cross-section of the porous body 10 in addition or as an alternative to calculate a porosity in a given cross-section of the porous body 10 without distinguishing the valid and invalid pores. It is anticipated to discover new characteristics of the porous body 10 which have not been discovered when a porosity is calculated without distinguishing the valid and invalid pores.

FIG. 12 is a schematic flowchart regarding a method of identifying valid flow paths according to the present disclosure. In Step S1, structure data is generated. In Step S2, data representing a pressure distribution is generated through fluid analysis based on the structure data. In Step S3, Valid flow path is identified based on a gradient of the pressure values along the flow direction of the fluid in the flow path. These steps can be performed by one or more computers 62 as described above, but not necessarily limited to this.

The computer 62 is an apparatus configured to perform fluid analysis of a porous body, which is ought to have inflow surface and outflow surface, based on structure data representing 3-dimentional structure of the porous body; to generate data indicating at least a pressure distribution of a fluid in a flow path in the porous body; and to identify a valid flow path that allows the fluid to flow from the inflow surface to the outflow surface, based on a gradient of the pressure values along the flow direction of the fluid in the flow path.

The computer 62 include a CPU (Central Processing Unit) and a memory, and the CPU executes a program stored in the memory. The memory is one or a combination of two selected from a group consisting of a memory device, hard drive, Magnetic Information Recording Medium, and Optical Information Recording Medium. The memory may be embedded in the CPU or both are coupled via a communication bus. The computer 62 can have various types of functional parts such as a GPU (Graphics Processing Unit), network interface and I/O.

It is envisioned that plural computers configure the above-described device. For example, a part of processing performed by the computer 62 is performed by a server connected thereto through a network. In a given specific example, the steps S2 and S3 are performed by a server coupled through a network. Calculation cost for a computer will be greater as the number of lattice points increases which are set in the structural data in the Lattice Method. From such a viewpoint, it is envisioned that another computer (server) coupled through a network is used as a computational resource.

Again, it is possible to identify an invalid flow path additionally or alternatively to identifying a valid flow path. The computer 62 can identify an invalid flow path that does not allow the fluid to flow from the inflow surface 10a to the outflow surface 10b based on a set of pressure values which do not change continuously along the flow direction of the fluid or a set of equal pressure values (or its area) which indicates no flow of the fluid. Note that, as an alternative to the equal pressure values, a set of pressure values within a constant or given numerical range can be used.

Identifying the invalid flow paths allows calculation of porosity regarding invalid flow path in a given cross-section of the porous body 10 and calculation of a volume of the invalid flow paths in the porous body 10. Note that, porosity in a given cross-section of the porous body 10 can be determined based on an image analysis of the cross section of the porous body represented by a structure data produced by the X-ray CT apparatus without distinguishing valid pore (a partial space of a valid flow path) and an invalid pore (a partial space of an invalid flow path). Also, a volume of pores in the porous body 10 can be determined based on summing of volumes of the pore voxels in the porous body represented by the structure data produced by the X-ray CT apparatus. Therefore, a porosity of valid flow paths in a given cross-section of the porous body 10 can be calculated by subtracting a porosity of invalid flow paths in the given cross-section of the porous body 10 from a porosity in the given cross-section of the porous body 10 calculated based on the structure data produced by the X-ray CT apparatus. A volume of valid flow paths in the porous body 10 can be similarly calculated.

FIG. 13 is a schematic flowchart regarding a method of identifying invalid flow paths according to the present disclosure. In Step S1, a structure data is generated. In Step S2, data representing a pressure distribution is generated through fluid analysis based on the structure data. In Step S3, Invalid flow path is identified based on a set of the pressure values within a given numerical range in the flow path. These steps can be performed by one or more computers 62 as described above, but not necessarily limited to this.

The computer 62 can determine a cross-sectional area of a valid flow path based on an isobaric surface. As would be understood from FIG. 11, the isobaric surface may possibly have a quite complicate cross-sectional shape, but the computer 62 is capable of calculating the area of the isobaric surface or its approximation through arithmetic function of the application program. The calculated area of the isobaric surface or its approximation can be determined as a cross-sectional area of a valid flow path.

The computer 62 can calculate a partial or entire volume of the valid flow path identified as described above. The computer 62 can determine a volume of a valid flow path based on the isobaric surfaces. Partial volume of a valid flow path can be determined based on, at least, a distance between first and second isobaric surfaces in the flow direction of the fluid and an area of the first and/or second isobaric surface. Volume of valid flow paths in a part of or in the entirety of the porous body 10 can be calculated through summing of the partial volumes of the valid flow paths.

The computer 62 can determine a ratio of a sum of respective cross-sectional areas of the valid flow paths in a given cross-section of a porous body to a sum of respective cross-sectional areas of the pores in the given cross-section of the porous body. The sum of respective cross-sectional areas of the pores in the given cross-section of the porous body can be determined using the structure data. For example, the sum of respective cross-sectional areas of the pores in the given cross-section of the porous body can be determined through binarizing the voxel values of the ceramics voxels and the voxel values of the pore voxels with a threshold value and calculating the area corresponding to the pore voxels. Binarizing the voxel values of the ceramics voxels and the voxel values of the pore voxels with a threshold value would be understood to be useful in various computational processes in the present disclosure.

The computer 62 can determine a ratio of a volume of valid flow path to a total volume of pores in the porous body. The total volume of the pores in the porous body can be determined based on processing of the structure data, such as summing of volumes of the pore voxels, by an appropriate application program. A method of calculating a volume of valid flow path is as described above.

The computer 62 can determine a ratio of sum of cross-sectional areas of valid flow paths in a given cross-section of a porous body to a sum of cross-sectional areas of both of the pore and the ceramics portion in the cross-section of the porous body. The sum of cross-sectional areas of both of the pore and the ceramics portion in a given cross-section of a porous body is illustrated, for example, by a frame of dotted line in FIG. 6. The sum of cross-sectional areas of the valid flow paths can be determined as understandable from the above disclosure.

The computer 62 can determine a ratio of a volume of valid flow path to a volume of a porous body. The volume of the porous body can be determined from the structure data and this is input to the computer as an initial value.

The computer 62 can determine an equivalent diameter of an isobaric surface based on an area and a perimeter length of the isobaric surface. Equivalent diameter can be expressed as in the following formula:

$$d=(4S/L)$$

in which S indicates an area of an isobaric surface, L indicates a perimeter length of the isobaric surface, and d indicates an equivalent diameter.

As appreciated from FIG. 6, the outline of the isobaric surface can take various shapes. However, this complicated shape can be replaced by one equivalent diameter based on parameters of area and perimeter length of the isobaric surface. Then, the computer 62 can determine a distribution of equivalent diameters. Furthermore, the computer 62 can determine a distribution of the number of the isobaric surfaces having equivalent diameters of the same value or within the same numerical range.

As described above, data indicating a pressure distribution of a fluid obtained as an outcome of the fluid analysis can also indicate a distribution of flow velocity of the fluid flowing through the flow paths. As described above, as a result of the fluid analysis such as Lattice Boltzmann Method, values of flow velocity, pressure, and density are calculated for each lattice point (if the lattice points are set). The computer 62 can determine a flow rate of the fluid flowing through an isobaric surface in a given time window based on a flow velocity indicated by the data and an area of the isobaric surface in which equal pressure values are distributed so as to cross the flow direction of the fluid in the valid flow path. Also, the computer 62 can determine a flow rate of the fluid flowing through a part of or the entirety of the valid flow paths in the porous body based on summing of the flow rates determined for the respective isobaric surfaces.

Note that, the flow rate Q (m$^3$/s) can be calculated by multiplication of a flow velocity $\upsilon$ (m/s) and a cross-sectional area A (m$^2$): Q=$\upsilon$×A.

The computer 62 can determine, for the isobaric surface, an evaluation value regarding filtering characteristic based on a flow rate determined for the isobaric surface. In general, a greater amount of gas flows through a flow path having a larger diameter, and a lesser amount of gas flows through a flow path having a lesser diameter. However, this relationship is not always true in a porous body 10 in which the flow paths are formed complicatedly. An evaluation value can be determined based on the flow rate, enabling a quantitative evaluation of usage of the flow path. For example, an evaluation value associated with an isobaric surface having a higher flow rate is low. An evaluation value associated with an isobaric surface having a lower flow rate is high.

Determination of a distribution of evaluation values enables analysis or evaluation of a performance of porous body for filtering usage.

Working Example

Structure data was generated by an X-ray CT apparatus for a porous cell-wall of a SiC segment used for a ceramics filter. Porosity was calculated through image analysis by a computer for a given cross-section of the porous body represented by the structure data. In particular, ceramics portion and pores were distinguished through binarization process. Next, porosity regarding the pores in the given cross-section was determined through image analysis. This porosity does not distinguish the valid pores and the invalid pores. This process was repeated for multiple cross-sections in a direction directed from the inflow surface to the outflow surface of the porous body. In FIG. 14, M1 indicates a ratio of invalid pore, M2 indicates a ratio of valid pore and M3 indicates a ratio of ceramics portion.

Based on the above-described structure data, fluid analysis based on Lattice Boltzmann Method was conducted for the porous body represented by the structure data so that a pressure value were calculated for each lattice point. Valid flow path was identified based on a gradient of these pressure values, i.e. the isobaric surfaces arranged along the gradient the pressure values. Porosity regarding valid flow paths was calculated through image analysis by a computer for a given cross-section of the porous body represented by the structure data. This process was repeated for multiple cross-sections in a direction directed from an inflow surface to an outflow surface of a porous body. Black rectangles in FIG. 14 indicates a variation of calculated porosity of valid pores. It could be said that the porosity of valid pore is lower than one expected.

Based on the above teaching, a skilled person in the art would be able to add various modifications to the respective embodiments.

What is claimed is:

1. A method comprising:
   performing fluid analysis of a porous body, which is ought to have inflow surface and outflow surface, based on structure data representing a 3-dimentional structure of the porous body to generate data indicating at least a pressure distribution of a fluid in a flow path in the porous body; and
   identifying a valid flow path that allows the fluid to flow from the inflow surface to the outflow surface based on a gradient of pressure values along a flow direction of the fluid in the flow path.

2. The method of claim 1 wherein the valid flow path is identified based on plural isobaric surfaces that have different pressure values along the flow direction of the fluid in the flow path.

3. The method of claim 2 wherein a cross-sectional area of the valid flow path is determined based on the isobaric surface.

4. The method of claim 2 wherein a volume of the valid flow path is determined based on the isobaric surfaces.

5. The method of claim 2 wherein a partial volume of the valid flow path is determined based on, at least, a distance between first and second isobaric surfaces in the flow direction of the fluid and an area of the first and/or second isobaric surface.

6. The method of claim 1 further comprising:
   determining a ratio of a sum of respective cross-sectional areas of the valid flow paths in a given cross-section of the porous body to a sum of respective cross-sectional areas of pores in the given cross-section of the porous body.

7. The method of claim 1 further comprising:
   determining a ratio of a volume of the valid flow path to a total volume of pores in the porous body.

8. The method of claim 1 further comprising:
   determining a ratio of a sum of cross-sectional areas of the valid flow paths in a given cross-section of the porous body to a sum of cross-sectional areas of both of pores and ceramics portions in the given cross-section of the porous body.

9. The method of claim 1 further comprising:
   determining a ratio of a volume of the valid flow path to a volume of the porous body.

10. The method of claim 2 further comprising:
    determining an equivalent diameter of the isobaric surface based on an area and a perimeter length of the isobaric surface.

11. The method of claim 10 further comprising:
    determining a distribution of equivalent diameters.

12. The method of claim 10 further comprising:
    determining a distribution of the number of the isobaric surfaces having equivalent diameters of the same value or within the same numerical range.

13. The method of claim 1 wherein said data also indicates a distribution of flow velocity of the fluid flowing through the flow path, the method further comprising:
    determining a flow rate of the fluid passing an isobaric surface in a given time window based on a flow velocity indicated by said data and an area of the isobaric surface in which equal pressure values are distributed so as to cross the flow direction of the fluid in the valid flow path.

14. The method of claim 13 further comprising:
    determining a flow rate of the fluid flowing through a part of or an entirety of the valid flow paths in the porous body based on a sum of the flow rates determined for the respective isobaric surfaces.

15. The method of claim 13 further comprising:
    determining, for the isobaric surface, an evaluation value regarding filtering characteristic based on the flow rate determined for the isobaric surface.

16. The method of claim 1 wherein the structure data is a 3-dimentional set of voxels that have digital values.

17. The method of claim 1 further comprising:
    setting lattice points to the structure data, and wherein
    a distance between isobaric surfaces that have different pressure values along the flow direction of the fluid in the flow path includes a distance that is less than a lattice interval in the structure data.

18. An apparatus configured to:
    perform fluid analysis of a porous body, which is ought to have inflow surface and outflow surface, based on structure data representing a 3-dimentional structure of the porous body to generate data indicating at least a pressure distribution of a fluid in a flow path in the porous body; and
    identify a valid flow path that allows a fluid to flow from the inflow surface to the outflow surface based on a gradient of pressure values along a flow direction of the fluid in the flow path.

19. A method comprising:
    performing fluid analysis of a porous body, which is ought to have inflow surface and outflow surface, based on structure data representing a 3-dimentional structure of the porous body to generate data indicating at least a pressure distribution of a fluid in a flow path in the porous body; and identifying an invalid flow path that does not allow the fluid to flow from the inflow surface to the outflow surface based on a set of pressure values within a given numerical range indicating no flow of the fluid in the flow path.

20. An apparatus configured to:

perform fluid analysis of a porous body, which is ought to have inflow surface and outflow surface, based on structure data representing a 3-dimentional structure of the porous body to generate data indicating at least a pressure distribution of a fluid in a flow path in the porous body; and identify an invalid flow path that does not allow the fluid to flow from the inflow surface to the outflow surface based on a set of pressure values within a given numerical range indicating no flow of the fluid in the flow path.

* * * * *